March 1. 1927.  R. D. EVANS  1,619,337

DISTRIBUTION SYSTEM

Filed Aug. 20, 1924  3 Sheets-Sheet 2

WITNESSES:
G. S. Neilson
S. M. Pineles

INVENTOR
Robert D. Evans
BY
Wesley G. Carr
ATTORNEY

Patented Mar. 1, 1927.

1,619,337

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

DISTRIBUTION SYSTEM.

Application filed August 20, 1924. Serial No. 733,035.

My invention relates to electrical distribution systems and it has particular relation to systems wherein a power transmission line of one frequency supplies power to a line operating on another frequency, at a plurality of substations interconnecting the lines.

In modern railway electrifications, it is contemplated to supply railway distribution systems operating on relatively low frequencies, such as 25 cycles, from large power transmission lines operating on the relatively high, commercial frequencies, such as 60 cycles. For supplying power to a railway distribution line, the same will be interconnected, at a number of frequency-converter substations, with the power transmission line.

One object of my invention is to provide a system of the above-described character wherein the inductive interference of currents flowing in the distribution system will be a minimum.

Another object of my invention is to provide a system of the above-described character wherein the power flow will be so directed as to produce a minimum of losses, thus securing the maximum efficiency.

Still another object of my invention is to provide a frequency converter wherein the shift of the phase angle between the voltages at the terminals leading to the two transmission lines is compensated and maintained in a predetermined relation independently of the load on the converter.

Still another object of my invention is to provide an alternating-current dynamo-electric machine arranged to maintain its terminal voltage in a predetermined phase relation to the system to which it is connected, independently of the load carried by the machine.

With the foregoing and other objects in view, my invention comprises the organizations, arrangements and details of operation described and claimed hereinafter and illustrated in the accompanying drawings, wherein

Figure 1:
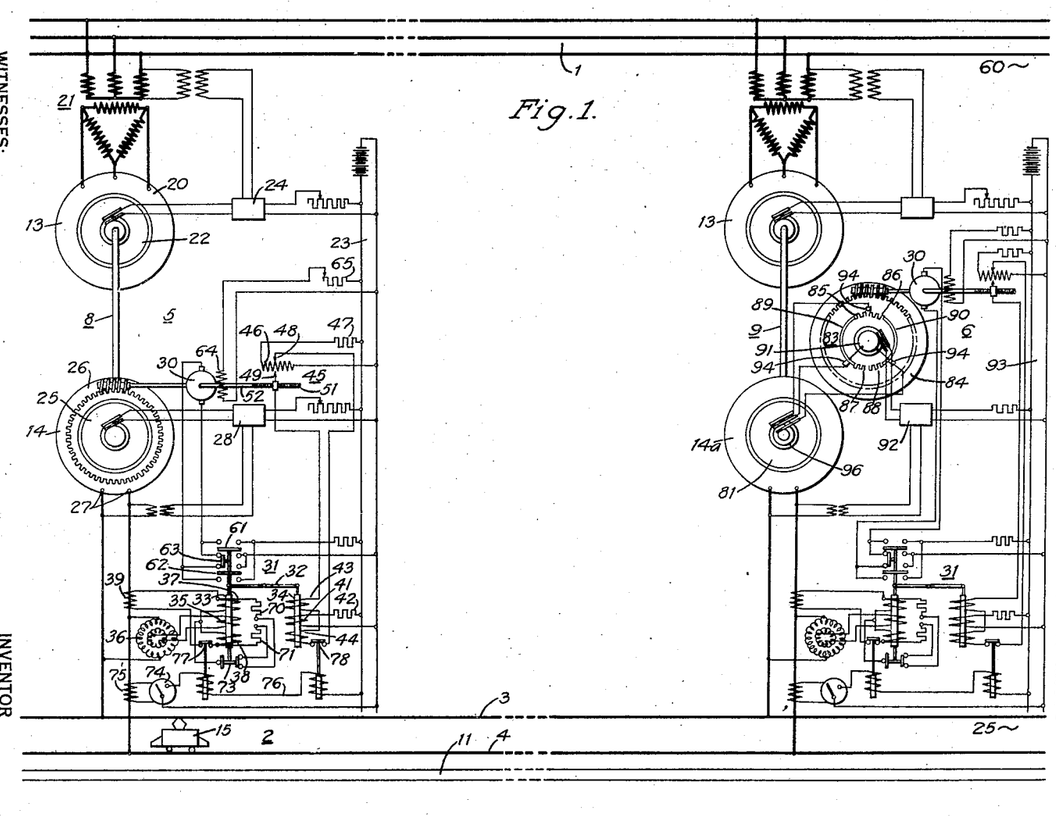
Figure 1 is a diagrammatic view of a system of distribution organized in accordance with my invention.

Referring to Fig. 1, a high-voltage, polyphase transmission line 1 has connected thereto power generating stations and loads (not shown in the drawing). The transmission line operates on the commercial frequency of 60 cycles. A single-phase railway distribution system 2 comprising a trolley line 3 and a return conductor 4, operates on a lower frequency of 25 cycles and is supplied from the power distribution line 1 at a plurality of substations, two of which are shown at 5 and 6, by means of frequency converters 8 and 9. An intelligence transmission line 11 is disposed along the right-of-way of the railway system within the zone wherein currents flowing in the railway distribution system would inductively interfere with the transmission of messages in the absence of proper protective provisions.

The frequency converters 8 and 9 are preferably of the synchronous type and each comprises two mechanically coupled synchronous machines 13 and 14 connected to the transmission line 1 and the distribution line 2, respectively. Under normal conditions, the machine 13 connected to the polyphase transmission line 1 acts as a motor driving the second machine 14 acting as a generator supplying single-phase power to the distribution line 2.

In distribution systems as commonly constructed, when a load, such as a locomotive 15, is placed on the trolley at a point between two converter-substations, all of the converters connected to the railway distribution line 2 tend to take a share of the load. Those adjacent to the load tend to take a larger share and those that are more remote from the load a proportionately smaller share.

If we consider, for the present, that the converter stations were originally adjusted to have the low-frequency terminal voltages of the converters in the several substations in phase, and if we further assume that the power transmission line 1 is of such high capacity that it maintains approximately the same phase relation between the terminal voltages at the several substations independently of their loads, the power supplied to the locomotive 15 will so divide that the phase displacement from the high voltage side of the several frequency converters through the converters and the corresponding section of the railway distribution line to the load is equal.

The phase difference between the voltage at the high-frequency terminals of the frequency-converters and the voltage at the terminals of the load in the distribution system comprises, in general, two parts, one corresponding to the phase displacement between the voltage at the high-frequency terminals of the converter and the voltage at the low-frequency terminals of the converter and the second part corresponding to the phase difference between the voltage at the terminals of the load and the low-frequency terminals of the converters. The shift in the phase angle between the voltage at the high-frequency and low-frequency terminals of the converter includes the electrical shift within each of the machines of the converter corresponding to the impedances of the individual machines and the mechanical shift of the rotor members with respect to the voltages of the individual machines, which differs with the magnitude of the load carried by the machine. The latter effect may be regarded as being of the nature of an additional impedance.

The systems formerly in use are objectionable for two reasons. First, it is undesirable to have remote stations supplying power to the locomotive 15 where nearby stations could do it, but, on the contrary, it is desirable to prevent the transmission of power, as much as possible, from the distribution system which is, in general, operated on a lower voltage than the power transmission line 1; and second, the currents traversing the railway distribution lines will inductively interfere with the intelligence transmission lines disposed in the neighborhood of the same.

According to my invention, I so operate the frequency changers as to control the power delivered by the same, mainly with a view to securing a definite load distribution in the railway distribution line proper, and I so adjust the operation of the apparatus back of the railway distribution-line terminals in each substation as to give the desired power delivery conditions in the railway distribution system. I have found that the conditions which produce the most economical operation, that is, confining the power delivery principally to the high-voltage, high-frequency power distribution line 1 and only to such sections of the railway distribution line as are immediately adjacent to the load, are identical with those required in order to reduce inductive interference to a minimum.

The foregoing result is obtained by maintaining the voltages at the low frequency terminals of all the substations in phase, independently of the magnitude of the load flowing through the same. Thus, when a load is connected at a point between two substations the power delivery will divide between the two adjacent substations in inverse proportion to the distance of the load from the substations, the currents traversing the line giving practically the same number of ampere miles flowing in one direction as in the opposite direction, making the inductive interference negligible. On the other hand, substations disposed behind the substations immediately adjacent to the load will not deliver power to the load since the terminal voltages at the two substations are in phase and no current can flow between the same. The elimination of "through-feed" of power on the railway distribution line from remote stations is in itself highly beneficial in reducing the magnitude of the possible inductive disturbances in the intelligence transmission lines paralleling the distribution line.

One of the principal features of my invention comprises the arrangement and operation of the frequency converters in the substations whereby I secure the above-described result of maintaining a definite phase relation between the voltages at the several substations independently of the load carried by the same.

In the preferred form of my invention, the frequency converters are so operated that the phase shift between the low frequency and high frequency terminals of the converter, attendant upon the transmission of power through the same, is fully compensated, thus creating a condition of zero phase shift between the terminal voltages of the converter under all conditions of operation. When referring to the phase relation between voltages of different frequencies, or between a voltage of a certain frequency and the mechanical rotation of the machine, I have in mind the relative displacement of the wave trains of the two voltages, or the relative displacement of the train of a voltage wave and the sequence of the positions of the rotor of the machine during the rotation thereof, as the case may be. Such a system will produce the desired conditions of operation on the railway distribution system whenever the operating characteristics of the high-frequency power transmission lines are such that the phase of the voltages at the converter terminals in the several stations varies only slightly and may be regarded as approximately fixed. The provision of means for compensating for the phase shift at the terminal voltages of the power transmission line is, however, contemplated within the scope of my invention, and some such means are described more fully hereinafter.

Several means may be employed for securing a zero resultant phase shift between the converter terminals of the frequency converter. Two such systems are illustrated in Fig. 1; the frequency converter 8 embodying a construction wherein the desired condition is obtained by shifting the stator of one of the machines of the frequency changer, and the other converter 9 embodying a construction wherein the effective axis of magnetization of the direct-current excited rotor member is shifted.

The motor 13 of the frequency converter 8 has a polyphase stator member 20 which is connected to the power transmission line 1 through a step-down transformer 21 and a rotor member 22 which is excited with direct current from a direct-current supply line 23 through an automatic regulator 24 which is operated in any desired or well known manner in accordance with the particular operating requirements of the high-power transmission line. I contemplate that the 60 cycle line 1 shall be operated as a constant-voltage line of the type described in the copending application of Frank G. Baum, Serial No. 569,704, filed June 20, 1922. Such a line is provided with synchronous-condensers or, in general, with synchronous, constant-voltage machines connected to the line at points between the main generating stations and main load stations in order to remove the effect of the line reactance in limiting the power flow through the line.

The rotor member 22 is mechanically coupled with the rotor member 25 of the low-frequency machine 14 of the frequency converter 8. The rotor member 25 cooperates with a single-phase stator 26 having terminals 27 leading to the railway distribution line 2. The direct-current line 23 supplies excitation to the rotor member 25, the excitation being so controlled by a regulator 28 as to maintain constant voltage at the low frequency terminals of the machine. The stator 26 is rotatably mounted and may be shifted in angular position by means of a direct-current motor 30 operating a worm gear drive upon the stator frame.

The stator-shifting motor 30 is operated to produce the desired phase relation of the low-frequency terminal voltage of the converter by means of a regulator 31 controlling the energization of the stator shifting motor 30 in response to the magnitude of the load flowing through the converter. Each position of the stator corresponds to a definite load carried by the machine and the stator position is so adjusted that for any load flowing through the machine the voltage at the low-frequency terminals is in the same phase with respect to the voltage at the high-frequency terminals as it was when no load was flowing through the machine.

The particular arrangement of the regulator 31 shown in the drawing is only illustrative, as a more elaborate arrangement will ordinarily be used in the practical embodiment of my invention. The regulator 31 is of the anti-hunting type and its construction is, in general, similar to the power-factor regulator described in Fig. 3 of the copending application of Charles W. Kincaid, Serial No. 543,819, filed March 15, 1922 (Case 9739) and assigned to the Westinghouse Electric & Manufacturing Company. The regulator 31 comprises a pivoted arm 32 carrying at its ends armature cores 33 and 34. One of the armature cores 33 is actuated in accordance with the power flowing from the machine 14 and is balanced against the action of the other core 34 which is actuated in accordance with the magnitude of the angle of shift of the stator frame 26.

The armature 33 is surrounded by a centrally located voltage coil 35 that is energized from a voltage transformer 36 connected across the terminals of the single-phase machine 14. On the two sides of the central coil 35 are disposed two oppositely wound, serially connected current coils 37 and 38 which are connected in series with a current transformer 39 energized by the current flowing between the single-phase machine 14 and the distribution line 2. Depending on the magnitude and the direction of the current flowing through the current transformer 39, the center of the resultant flux induced by the coils 35, 37 and 38 will shift from the central position of the voltage coil 35 thereby moving the core 33 upwardly or downwardly.

The other armature 34 is operated by the action of a similar group of coils, the centrally located coil 41 being energized through a resistor 42 from the direct-current line 23 and the two serially connected coils 43 and 44 being energized in accordance with the angle of shift of the stator 26 from an auxiliary resistor device 45. The resistor device 45 has a resistor element 46 connected through a series resistor 47 across the direct-current line 23. A voltage of variable magnitude and direction may be tapped off from the resistor element 46 by means of two adjustable contact members 48 and 49 leading to the terminals of the serially-connected coils 43 and 44. One of the adjustable contact members 49 is moved back and forth by a threaded portion 51 of a spindle 52 driven by the stator-shifting motor 30. Thus the voltage tapped off from the resistor element 46 is proportional to the amount of rotation of the armature 30 and thus to the amount of shift of the stator 26.

The regulator 31 controls the energization of the stator-shifting motor 30 by means of contact members 61, 62 and 63 actuated by the regulator. In actual practice, the armature circuit will usually be energized by means of intermediary control relays which I have omitted in the drawing in order to simplify the same. When the regulator is in the neutral position, shown in the drawing, the contact member 63 short-circuits the two leads to the armature terminals of the stator-shifting motor 30. The field winding 64 of the motor is shown continuously energized through a rheostat 65 from the direct-current line 23. When the regulator moves from the neutral position in an upward or downward direction, the contact member 63 opens the short-circuit of the armature terminals, while the contact members 61 and 62 provide a connection between the direct-current line 23 and the armature terminals of the shifting motor 30 in the one or the other direction, depending on the direction of the movement of the regulator. The motor armature is thus energized by a current flowing in one direction or the other, producing a torque driving the shifting motor and thus the stator 26 in one direction or the other, depending on the operation of the regulator 31.

The operation of the organization described hereinbefore is as follows: When no current passes through the serially connected coils 37, 38 and 43, 44 of the two cores 33 and 34, respectively, the same are maintained in the neutral position shown in the drawing by the action of the centrally located coils 35 and 41. When a load current flows from the single-phase machine 14 towards the distribution system 2, the current through the current transformer 39 energizes the serially connected coils 37 and 38, actuating the core 33 in one direction. The core 33 moves from its neutral position energizing the armature of the stator shifting motor 30 through the contact members 61 and 62. The stator is thereupon shifted to a position in which the phase of the low-frequency terminal voltage with respect to the high-frequency terminal voltage is the same as before, when no current was flowing through the machine.

As the motor 30 rotates, shifting the stator from its original position, it shifts the adjustable contact member 49 of the resistor device 45 from its neutral position, thereby energizing the serially connected coils 43, 44 of the second armature 34 of the regulator 31 in a direction to oppose the movement of the armature 33, until the regulator is returned to its neutral position again de-energizing the motor 30. As the regulator is moved to the neutral position, the armature terminals of the motor 30 are short-circuited by the contact member 63, producing a powerful braking action and quickly arresting the motion of the armature.

The regulator 31 is so designed as to prevent over regulation or hunting action. I have schematically indicated an arrangement of that character by the provision of two resistor elements 70 and 71 connected between the end terminals of the two serially connected coils 37 and 38 and the junction point thereof through a contact member 73 of the regulator. The contact member is so arranged that the connection of the two resistor elements 70 and 71 and the junction point of the coils 37, 38 is maintained only when the regulator is in neutral position. As soon as the armature 33 moves away from the neutral position, one of the resistor elements is disconnected, unbalancing the current traversing the two serially connected coils and producing such a change in the energization of the armature 33 as to anticipate the action of the stator-shifting motor 30 on the energization of the series coils 43, 44 of the second core 34.

The regulator 31, as shown in the drawing, will operate for power delivery in both directions, that is, from the power transmission line 1, toward the railway distribution line 2, when a load is connected to the distribution line, and also when power is delivered from the distribution line 2 toward the power transmission line 1 during periods of regeneration.

Instead of shifting the position of the stator 26 of one of the machines of the frequency converter, the frequency converter 9 embodies an organization wherein the phase of the terminal voltage of the frequency converter is regulated by controlling the axis of magnetization of the rotor member 81 of one of the machines of the converter, for example, the single-phase machine 14a. The rotor member 81 is provided with a polyphase winding which is energized through an auxiliary resistor device 83 in such manner as to vary the excitation of the several phases of the polyphase winding of the rotor member 81 to produce the desired shift of the axis of the magnetization of the same, in order to maintain the predetermined phase relation between the high-frequency and the low-frequency terminal voltages of the converter.

The particular construction of the resistor device 83 does not constitute an element of my invention and I have shown a construction which is similar to that described in the copending application of Errol B. Shand, Serial No. 633,666, filed April 21, 1923 (Case 8612) and assigned to the Westinghouse Electric & Manufacturing Company. The resistor device 83 comprises a circular supporting member 84 having mounted thereon four resistor segments 85, 86, 87 and 88 and two conductor segments 89 and 90. The conducting segments and the resistor segments are assembled in the form of a circle and are so mounted that each of the conducting elements 89 and 90 is connected to two adjacent resistor segments with open connections between each pair of adjacent resistor segments. In the particular device illustrated in the drawing, the width of the resistor segments corresponds to an arc of 30° and that of the conducting segments 89 and 90 to an arc of 120°. The conducting segments 89 and 90 are connected through a pair of slip rings 91 and a regulator 92 to an auxiliary direct-current line 93. Three brushes 94 having a relative displacement of 120° cooperate with the circularly disposed segments 85 to 90 and lead through slip rings 96 to the terminals of the polyphase windings 81 of the rotor.

By rotating the supporting member 84 through 360°, the axis of magnetization of the rotor member 81 may be shifted by 360°. A shift in the position of the rotor member 84 corresponds to a shift of approximately the same magnitude of the axis of magnetization of the rotor member 81 of the single phase machine 14a. The phase-shifting member 84 is rotated by means of a motor 30 and a regulator 31 of the same general design as that shown in connection with the frequency converter 8 described hereinbefore. In the actual design of the resistor device 83, it will not be necessary to provide for a shift of the axis of magnetization of the full 360°, and the individual elements of the resistor will be so arranged as to produce the desired shift with the best utilization of material and space.

In the system described in Fig. 1 it has been assumed that the power transmission line 1 which supplies the railway distribution line 2 is of such capacity and operates under such conditions that it maintains a very definite phase relation between the voltages at the terminals of the several converter substations throughout the entire duration of its operation. In many cases, however, and particularly, if different amounts of power are transmitted through the transmission line during different periods of the day, the phase of the voltage at the substation terminals of the high-frequency line 1 will undergo great changes, depending on the power transmitted by the line. A change in the phase-angle between the voltages at the converter substations of the power transmission line produces a change in the phase angle of the terminal voltages at the substations of the distribution line 2. In consequence thereof, when the frequency converters in the individual substations were initially adjusted to generate voltages of a predetermined phase relation on the low-frequency distribution system, that relation is upset when the phase relation of the voltages in the high-frequency power-transmission line changes incident to a change in the power-flow through the same.

Where the peak load that may be demanded from a point on the railway distribution line is very large, it may be desirable to have substations which are disposed behind those that are immediately adjacent to the load share in supplying the power. Accordingly, the control of the phase of the converter-voltage may be adjusted to vary the degree of phase-shift compensation depending on the magnitude of the load. By properly grading the resistance 46, for instance, of the control circuit of the regulator 31, the degree of phase shift compensation may be varied as the load varies.

The compensation may also be entirely cut out after the load through the converter exceeds a predetermined value, as by means of a relay 74 energized by a current transformer 75 in accordance with the current flowing through the single-phase machine 14 of the converter. After the current through the relay exceeds a predetermined value, a circuit 76 is closed, energizing two electromagnetic switches 77 and 78 opening the circuits through the series coils 37, 38 and 43, 44, respectively. The regulator 31 thereupon remains in its neutral position, cutting out the compensating action. As the phase of the voltage at the converter-terminals starts to lag, the adjacent converter station begins to send power into the load. Under some circumstances, it may even be desirable to reverse the direction of compensation after the load exceeds a predetermined value.

Figure 2:
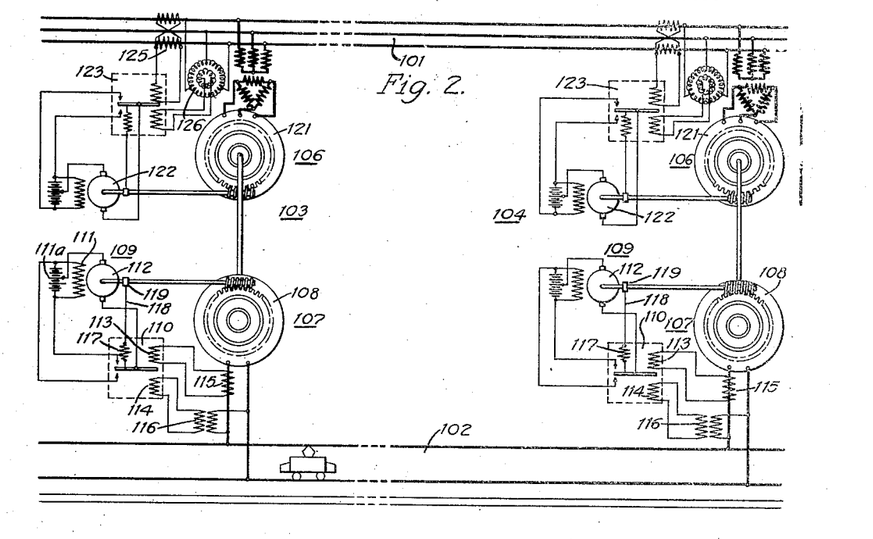
Figs. 2, 3 and 4 are views similar to Fig. 1 illustrating modifications of my invention.

According to my invention, I provide an organization which so compensates for variations in the phase relation of the terminal voltages on the high-frequency side of the converters that the desired phase relation between the terminal voltages of the converters on the low-frequency side of the same is not disturbed by variations in the power-flow conditions in the high-frequency power-transmission line. A system of the character just mentioned is schematically illustrated in Fig. 2, wherein it is assumed that current traverses the power transmission line 101 in a given direction, say from the left-hand side toward the right-hand side. Frequency converter stations 103, 104 interconnect the power transmission line 101 with the railway distribution line 102.

Each frequency converter station comprises two mechanically coupled synchronous machines 106 and 107, similar to the machines described in Fig. 1. The machines 107 connected to the single-phase railway distribution line 102 are shown provided with a rotatable stator member 108 which is shifted by a motor 109 in response to a diagrammatically indicated regulator 110, in a manner similar to that described in connection with machine 14 of Fig. 1. To simplify the illustration, the field winding 111 of the stator-shifting motor 109 is shown connected across the terminals of a direct-current source 111a, the armature 112 of the motor being connected between a mid-tap of the direct-current source 111a and either one or the other of the end terminals of the direct-current source to produce rotation of the motor in either direction, depending on the action of the regulator 110. The regulator 110 is actuated in accordance with the power transmitted between the machine 107 and the railway distribution line 102 by means of coils 113, 114, energized, respectively, from a current transformer 115 and potential transformer 116 in a familiar manner.

The action of the regulator 110, which is energized in accordance with the power transmitted between the machine 107 and the distribution line 102, is balanced against the amount of shift of the stator frame as indicated schematically by means of a spring 117 having a flexible cord 118 connected to a drum 119 on the shaft of the stator-shifting motor 109, whereby the stator frame is shifted by a definite angle corresponding to the amount of power transmitted through the machine to produce the condition of zero resultant phase shift as described hereinbefore.

In order to compensate for variations in the phase angle at the high-frequency terminals of the several converter substations, I provide an additional compensating feature by shifting the stator members 121 of the machines 106 which are connected to the high-frequency transmission line 101. To this end, the stator frame is rotatably mounted and is shifted by a motor 122 and a regulator 123 in a manner similar to that shown in connection with the machine 107 which is connected to the low-frequency power distribution line 102. Since the phase angle of the terminal voltages of the converters operating on the high-frequency line will depend upon the magnitude of the power flowing through the same, the regulators 123 are actuated in accordance with the power-flow in the power transmission line 101 by means of current transformers 125 and potential transformer 126 arranged in a familiar manner.

In actual constructions, the shifting devices operating the two stator members may be combined. In general the compensating arrangement as shown and described hereinbefore will be so operated through the combined action of the several regulators as to produce the desired final condition of securing a predetermined phase relation between the voltages at the low-frequency terminals of the several converters. As an additional advantage, a distribution system organized in accordance with my invention as described in Fig. 2, for instance, confines the "through-power transmission" to the high-frequency power transmission line and avoids overloading of the frequency converters by shunting a portion of the through-power transmission over the low frequency line.

Figure 3:
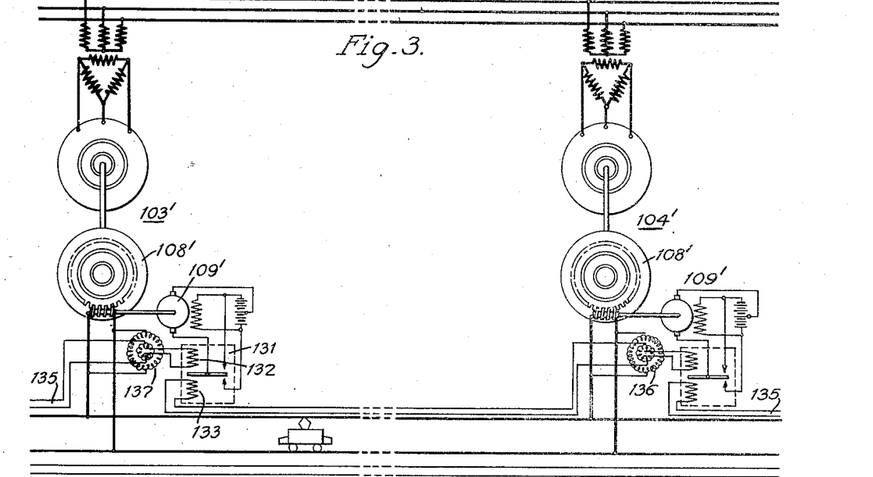

In Fig. 3 is shown an organization wherein the low-frequency terminal voltages of the frequency converters is maintained in a proper predetermined phase relation, as defined hereinbefore, by means of an auxiliary control channel interconnecting the several substations. With this organization the shift of relative phase position of one of the members of the frequency converters is regulated solely from the standpoint of maintaining the proper phase relation between the low frequency terminal voltages and is only responsive in an intermediary way to the power-flow through the converters.

For purposes of illustration, I have shown the stator member 108' of one of the machines of the frequency converters rotatably mounted and shifted by an auxiliary motor 109, in a manner similar to that shown in Fig. 2. A regulator 131 of the same general character as the regulator 110 is actuated by an element 132 responsive to the phase of the voltage at the low frequency terminals of the converter in the substation 103' and an element 133 responsive to the phase of the voltage and the low frequency terminals in the adjacent substation 104'. Since the regulator 131 is operated solely with a view to securing a predetermined phase relation between the two low-frequency terminal voltages in the adjacent substations, the element balancing the operation of the regulator against the shift of the stator 108 shown in the regulator 110, Fig. 2, is omitted.

As a control channel connecting the element 133 of the regulator 131 with the substation 104' I have shown an auxiliary line 135 connected between the element 133 and a potential transformer 136 connected across the terminals of the low-frequency machine 108' in the adjacent substation 104'. The other element 132 of the regulator is shown energized from a potential transformer 137 connected across the low-frequency terminals of the substation 103' in which the regulator operates.

Figure 4:
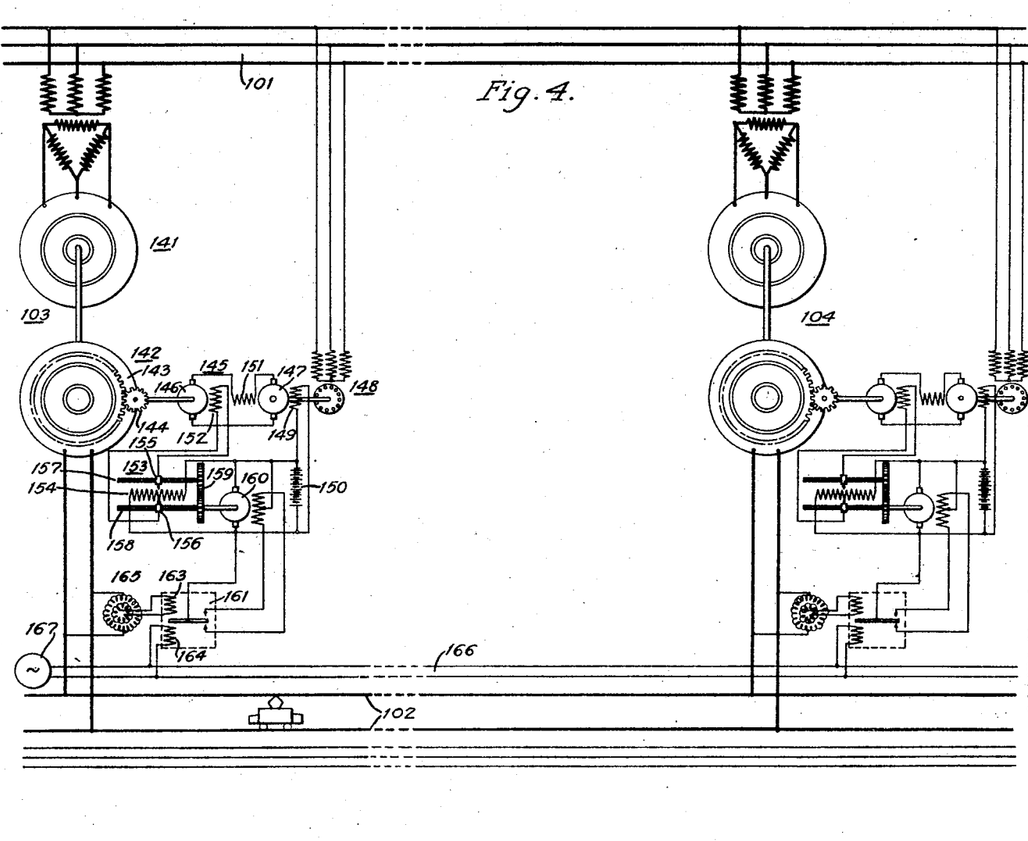

In Fig. 4 I have shown an organization having the same general character as that described in Fig. 3 but embodying several features that are different. Each of the frequency converters mounted in the individual substations 103, 104 comprises two mechanically coupled machines 141 and 142, one of the machines, for instance, the machine 142, being connected to the low-frequency distribution line 102 being provided with a freely rotatable stator member 143 which acts through a reversible driving gear connection 144 upon a torque machine 145. The torque machine 145 comprises a direct-current armature 146 which is supplied from a constant-current generator 147 that is driven by a small auxiliary induction machine 148 supplied from the power transmission line 101.

The constant-current generator 147 has a separately excited field winding 149 supplied from a direct-current source 150 and a differential series field winding 151. The torque machine 145 has a separately excited field winding 152 which is energized through a motor-operated resistor device 153 comprising a resistor element 154 connected across the terminals of the direct-current source 150. Two adjustable contact members 155 and 156, cooperating with the resistor member 154, are shiftably mounted upon oppositely rotating threaded spindles 157, 158 actuated through a gear drive 159 by an auxiliary driving motor 160. Depending upon the direction of the rotation of the motor 160, the adjustable contact members are moved across the resistor element 156 in one direction or the other, applying to the field winding 152 of the torque machine 145 an excitation of variable direction and magnitude.

The driving motor 160 is of any well-known construction and is controlled by a regulator 161 to maintain a predetermined phase relation between the low-frequency terminal voltages of the frequency converters. The regulator 161 has two actuating elements 163 and 164, the first element 163 being connected through a potential transformer 165 across the low-frequency terminals of the converter station 103, and the other element 164 being actuated through an auxiliary control channel shown by means of conductors 166 interconnecting the several substations.

In the particular organization shown in Fig. 4, the conductors 166 are energized from an auxiliary source 167 maintaining a definite phase relation between the terminals of the elements 164 of the regulators in the individual substations. The several regulators are energized in accordance with the departure of the phase of the voltage in the respective substations from the predetermined relation as required by the defined relation of the low-frequency terminal voltages of the converters. Any departure of the phase of the voltage of the low frequency terminals of the converter actuates the regulator and thus the motor 160 to excite the field winding 152 of the torque machine 145 in such direction and magnitude as to bring the phase of the terminal voltage back to its desired relation. In this manner, I obtain a very flexible and close adjustment of the phase relations of the terminal voltages of the low-frequency distribution line necessary for the proper distribution of the power-flow as hereinabove pointed out.

The modification shown in Fig. 4 is of particular importance in connection with systems wherein the low-frequency line is supplied from separate generating stations and the frequency of the same may occasionally vary upon the application of a load to the line.

The modifications described hereinbefore embody a number of principles which I believe to be novel in the art and which are essential for securing satisfactory operation of modern, interconnected power distribution systems. In particular, certain of the principles will be applicable to secure appropriate operating characteristics to systems wherein all the interconnected lines are operated at the same frequency. Accordingly, some of the claims are drawn to be broad enough to cover such systems without reference to a difference in the frequencies of the two systems. The principles characterizing my invention may be embodied in a different manner than that described hereinbefore and I desire that any such modification which falls within the spirit of my invention shall be covered by the appended claims.

I claim as my invention:

1. The combination with a high-voltage transmission line a low-voltage distribution line, and means for interconnecting said lines at a plurality of spaced points for the interchange of power, of means responsive to the power transmitted by one of said interconnections for substantially offsetting the phase distortion in said interconnecting means.

2. The combination with a high-voltage transmission line, a low-voltage distribution line, and means for interconnecting said lines at a plurality of spaced points for the interchange of power, said transmission line carrying a through load as well as the power interchanged with said distribution line, of means responsive to the power transmitted in said transmission line between two of the points of connection with said distribution line for substantially offsetting effects of variations of the phase relation between said points in the transmission line and means.

3. The combination with a high-voltage transmission line, a low-voltage distribution line, and means for interconnecting said lines at a plurality of spaced points for the interchange of power, said transmission line carrying a through load as well as the power interchanged with said distribution line, of means responsive to the power transmitted in said transmission line between two of the points of connection with said distribution line for substantially offsetting effects of variations of the phase relation between said points in the transmission line, and means responsive to the power transmitted in one of said interconnections for substantially offsetting the phase distortion in said interconnecting means.

4. The combination with a high-voltage transmission line, a low-voltage distribution line, and means for interconnecting said line at a plurality of spaced points for the interchange of power, of electro-responsive means for maintaining a substantially predetermined phase relation between the electromotive forces at the terminals of each of said interconnections.

5. The combination with a high-voltage transmission line, a low-voltage distribution line, and means for interconnecting said lines at a plurality of spaced points for the interchange of power, said transmission line carrying a through load as well as the power interchanged with said distribution line, of electro-responsive means for substantially offsetting the effect of the phase shifting of the electromotive forces in said transmission line for producing the effect of a predetermined phase relation between the high-voltage electromotive forces at all of said interconnections.

6. The combination with a high-voltage transmission line, a low-voltage distribution line, and means for interconnecting said lines at a plurality of spaced points for the interchange of power, said transmission line carrying a through load as well as the power interchanged with said distribution line, of electro-responsive means for substantially offsetting the effect of the phase shifting of the electromotive forces in said transmission line for producing the effect of a predetermined phase relation between the high-voltage electromotive forces at all of said interconnections, and electro-responsive means for maintaining a substantially predetermined phase relation between the electromotive forces at the terminals of each of said interconnections.

7. The combination with a transmission line of one frequency, a distribution line of another frequency, and frequency-changing means for interconnecting said line at a plurality of points for the interchange of power, of electro-responsive means for maintaining a substantially constant phase relation between the electromotive forces at the terminals of each of said interconnections.

8. The combination with a synchronous alternating-current machine, of means responsive to the load carried by said machine for maintaining a predetermined relation between the phase of the mechanical rotation and the phase of the terminal voltages.

9. The combination with a synchronous alternating-current machine, of electro-responsive means for substantially offsetting the variations of the phase of the mechanical rotation with respect to the line voltages.

10. The combination with an alternating-current transmission line and a synchronous dynamo-electric machine, of means responsive to the load carried by said transmission line for varying the phase position of the rotor of said machine to substantially offset the variations in the phase relations between the voltages at different points along said transmission line.

11. The combination with an alternating-current transmission line and a synchronous dynamo-electric machine, of electro-responsive means for varying the phase position of the rotor of said machine to substantially offset variations in the phase relations between the voltages at different points along said transmission line.

12. The combination with two alternating-current systems of different frequencies, of a frequency converter interconnecting said systems, said frequency converter being of a type wherein the electrical conditions of one system determine the phase of the voltage of the other system, and means for compensating the effect of the variations in the electrical conditions in said system.

13. The combination with two alternating-current systems of different frequencies, of a frequency converter interconnecting said systems, said frequency converter being of a type wherein the phase of the voltage of one system determines the phase of the voltage of the other system, and means for maintaining predetermined phase relations in one system independently of variations in the phase relations of the voltage on the other system.

14. The combination with two alternating-current systems of different frequencies, of a plurality of frequency converters interconnecting said systems at spaced points, the phase relations of the voltages of one system being subject to variations, and means for maintaining predetermined phase relations of the voltages of the other system independently of said variations.

15. The combination with two alternating-current systems of different frequencies, of frequency converters interconnecting said systems at two spaced points, and means for maintaining the phases of the voltages at the converter terminals of one of said systems in a predetermined relation independently of variations in operating conditions of said systems.

16. The combination with two alternating-current systems of different frequencies, of a frequency converter comprising two mechanically connected synchronous dynamo-electric machines interconnecting said systems, and means for maintaining predetermined phase relations in one system independently of variations in the phase relations of the other system.

17. The combination with two alternating-current systems of different frequencies, of a frequency converter comprising two mechanically connected synchronous dynamo-electric machines interconnecting said systems, each machine comprising primary and secondary members, and means responsive to the phase of the voltage at the converter terminals of one of said systems for varying the angular relation of the field axis of a member of one machine with respect to the field axis of the corresponding member of the other machine.

18. The combination with two alternating-current lines of different frequencies, of frequency converters interconnecting said systems at spaced points, each converter comprising two mechanically connected synchronous machines each having a primary member and a secondary member, and means for varying the relative angular positions of the field axes of corresponding members of said converters for offsetting the variations in the phase relation of the voltages at the converter terminals.

19. The combination with two alternating-current lines of different frequencies, of frequency converters interconnecting said systems at spaced points, each converter comprising two mechanically connected synchronous machines each having a primary member and a secondary member, and means for varying the relative angular positions of the field axes of corresponding members of said converters for maintaining the voltages at the converter-terminals of one of said lines in phase during changes in the load conditions.

20. The combination with two alternating-current lines of different frequencies, of frequency converters interconnecting said systems at spaced points, and means for maintaining the voltages at the converter-terminals of one of said lines in phase during changes in the load conditions.

21. A frequency converter comprising two mechanically connected synchronous machines each having a primary member and a secondary member, and electro-responsive means for varying the relative angular positions of the field axes of corresponding members of said machines for offsetting variations in the phase relations caused by variations in the power transmitted through the converter.

22. A frequency converter comprising two mechanically connected synchronous machines each having a primary member and a secondary member, and means for varying the relative angular positions of the field axes of corresponding members of said machines for offsetting variations in the phase relation of the voltages at the terminals of said machines, said means comprising an element responsive to the power transmitted through the converter and an element responsive to the angle enclosed by the field axes of said members.

23. A frequency converter comprising two mechanically connected synchronous machines each having a primary member and a secondary member, and means for maintaining a predetermined phase relation between the terminal voltages of said machines independently of the power transmitted therethrough.

24. A frequency converter comprising two mechanically connected dynamo-electric machines each having a primary member and a secondary member, and means for maintaining a predetermined phase relation between the terminal voltages of said machines independently of the power transmitted therethrough.

25. A frequency converter comprising two mechanically connected synchronous machines each having a primary member and a secondary member, and means for varying the relative angular positions of the field axes of corresponding members of said machines for offsetting variations in the phase relation of the voltages at the terminals of said machines, said means comprising a regulator of the anti-hunting type having an element responsive to the power-flow through the converter and an element responsive to the angle enclosed by the field axes of said members.

26. The combination with an alternating-current power transmission line and a power distribution line having different operating characteristics, of power translating stations connecting said lines at a plurality of spaced points for supplying said power distribution line, and means for offsetting the influence of variations in the phase relations of the voltages at the power-transmission line terminals of said translating apparatus upon the operating condition in said distribution line.

27. The combination with an alternating-current power distribution line, of a plurality of power translating stations connected to said line at spaced points for supplying power to the same, the phase relations of the power generated by said stations being subject to variations independent of the operating conditions in said line, and means for offsetting the effect of such variations upon the operating conditions in said line.

28. The combination with a main power source and a main load, of an electrical power transmission line transmitting power between said source and said main load, an electrical distribution line, power translating apparatus interconnecting said lines at spaced intervals, and means for restricting the through-power flow to said main transmission line only.

29. The combination with an electrical power-transmission line operated to transmit power between the end points thereof under conditions wherein the effect of the line reactance is substantially diminished, of a power distribution line, power translating apparatus interconnecting said lines at spaced points, and means for so operating said power translating apparatus as to render the operating conditions of said distribution line independent of the operating requirements of said power transmission line.

30. The combination with an alternating-current power-transmission line operated to transmit power between the end-points thereof limited substantially only by the resistance and leakage of the line, of a distribution line, power-translating apparatus interconnecting said lines at spaced intervals, a load supplied from said distribution line, and means for so operating said translating apparatus as to restrict the power flow to said load to said transmission line and such sections of said distribution line as extend from the load to the nearest of said translating apparatus on both sides of said load.

31. The combination with a high-voltage alternating current transmission line, of a relatively low voltage distribution line, a plurality of power translating stations interconnecting said lines at spaced intervals, means for supplying a load from a point on said distribution line and means for restricting the power transmitted to said load to said high voltage transmission line and such sections of said distribution line as extend between said load and the adjacent power translating stations.

32. An alternating-current railway system comprising a trolley line operating on one frequency, a power transmission line operating on another frequency, frequency converting stations interconnecting said lines at spaced intervals, means for supplying a load from a variable point on said trolley line, and means for restricting the power transmitted to said load to said power-transmission line and such sections of said trolley line as extend from said load to the immediately adjacent frequency converting stations on both sides of said load.

33. The combination with two alternating-current lines of different frequencies, of frequency converters interconnecting said systems at spaced stations, each converter comprising two mechanically connected synchronous machines each having a primary member and a secondary member, and electro-responsive means for so varying the relative angular positions of the field axes of corresponding members of said converters that substantially predetermined phase relations are maintained in the voltages of one of said lines at a plurality of converter stations notwithstanding changes in load conditions.

34. The combination with two alternating-current lines, of electric translating devices interconnecting said systems at spaced stations, each translating device comprising primary and secondary members, and electro-responsive means for so varying the relative angular positions of the field axes of corresponding members of said translating devices as to maintain substantially predetermined voltage phase relations in one of said lines at a plurality of translating stations notwithstanding changes in operating conditions in one or both of said lines.

35. An alternating-current railway system comprising a trolley line operating on one frequency, a power transmission line operating on another frequency, frequency converting stations interconnecting said lines at spaced intervals, means for supplying a load from a variable point on said trolley line, and means for so operating said frequency converting stations that the inductive interference of the operating currents flowing in said system is substantially negligible.

36. An alternating-current railway system comprising a trolley line operating on one frequency, a power transmission line operating on another frequency, frequency converting stations interconnecting said lines at spaced intervals, means for supplying a load from a variable point on said trolley line, each converter-station comprising two mechanically connected synchronous machines each having a primary member and a secondary member, and means for varying the relative angular positions of the field axes of corresponding members of said converters for reducing the inductive interference of the operating currents flowing in said system.

37. The combination with two alternating-current lines of different frequencies, of frequency converters interconnecting said systems at spaced stations, and automatic phase-adjusting devices controlling the division of load between the frequency-converter stations.

38. The combination with an alternating-current power transmission line and a power distribution line having different operating characteristics, of power translating stations connecting said lines at spaced points, and means for maintaining a predetermined phase relation between the voltages at the distribution-line terminals and the power-line terminals of each of said stations, independently of the power transmitted through said stations.

39. An alternating-current railway system comprising a trolley line operating on one frequency, a power transmission line operating on another frequency, frequency converting stations interconnecting said lines at spaced intervals, means for supplying a load from a variable point on said trolley line, and means for so operating said frequency converting stations that the voltages at the points at which the substations feed the trolley line are in phase throughout the operation.

40. An alternating-current railway system comprising railway distribution operating on one frequency, a power transmission line operating on another frequency, frequency converting stations interconnecting said lines at spaced intervals, means for supplying a load from a variable point on said railway distribution line, and means for so operating said frequency converting stations that the voltages at the points at which the substations feed the trolley line are in phase throughout the operation.

In testimony whereof, I have hereunto subscribed my name this 18th day of August, 1924.

ROBERT D. EVANS.